Oct. 2, 1951  E. J. ABBE  2,569,740
SCOOP MECHANISM FOR TRUCKS
Filed Sept. 7, 1946  5 Sheets-Sheet 1

INVENTOR.
EDWARD J. ABBE
BY Fay Golrick & Fay
ATTORNEYS

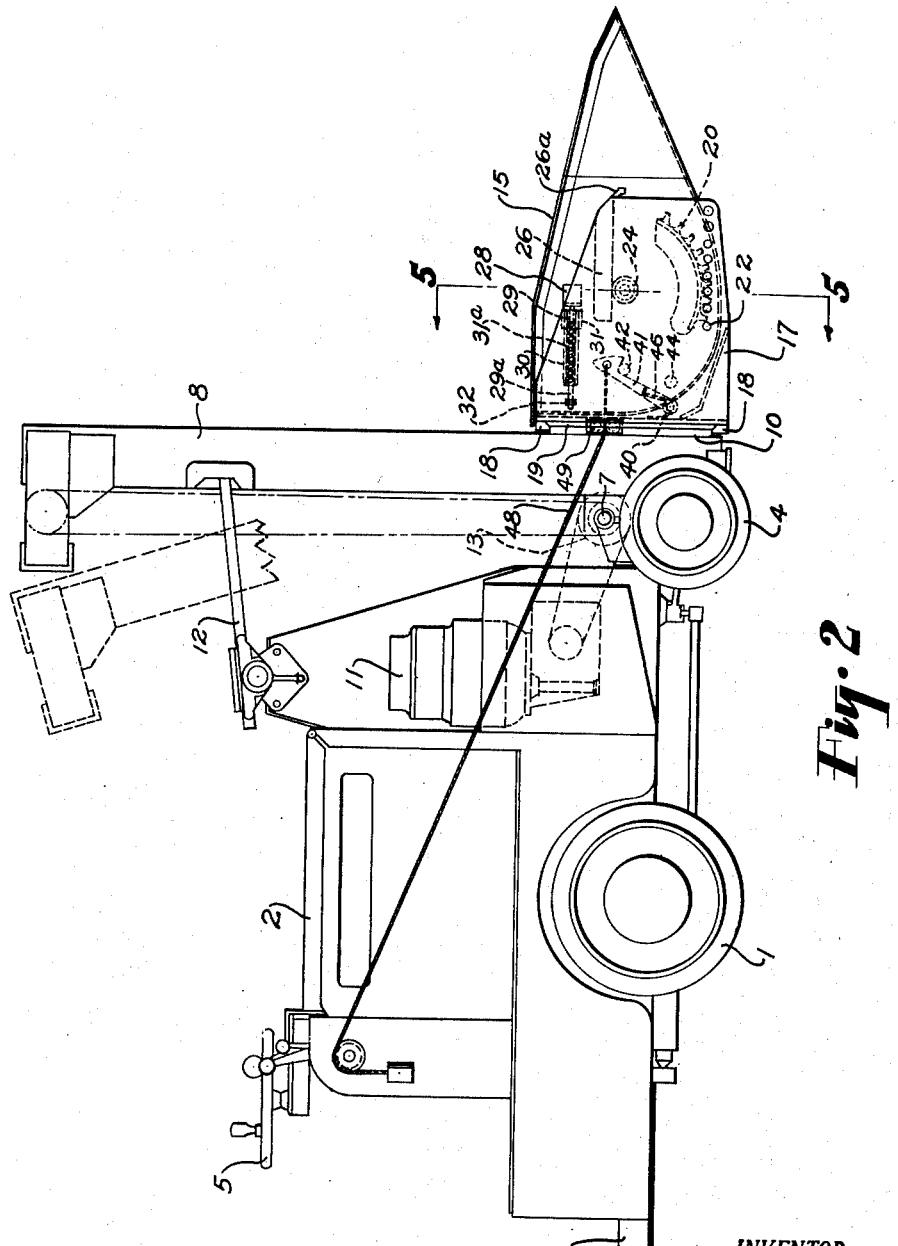

Oct. 2, 1951     E. J. ABBE     2,569,740
SCOOP MECHANISM FOR TRUCKS
Filed Sept. 7, 1946     5 Sheets-Sheet 3
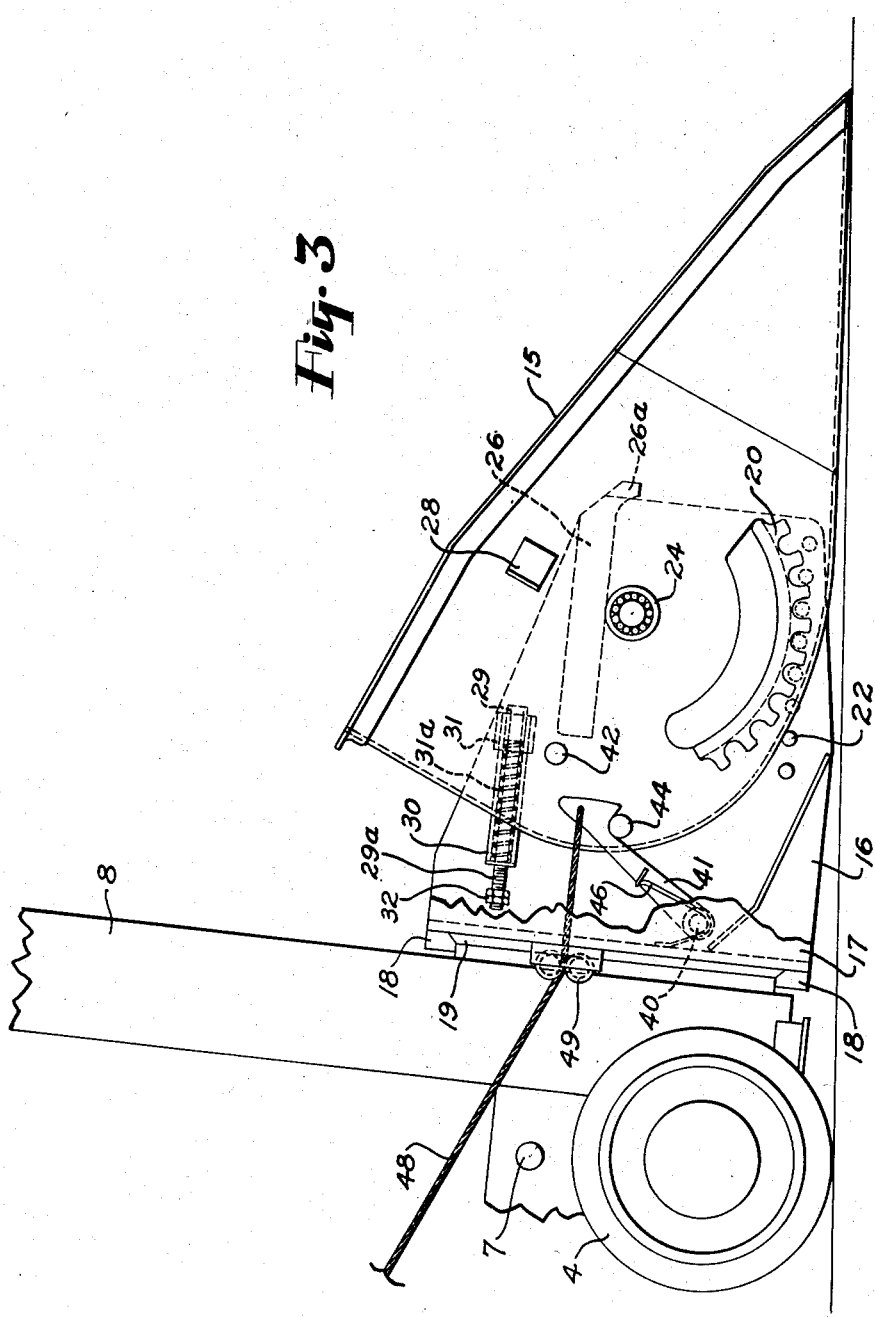
INVENTOR.
EDWARD J. ABBE
BY *Fay Golrick & Fay*
ATTORNEYS

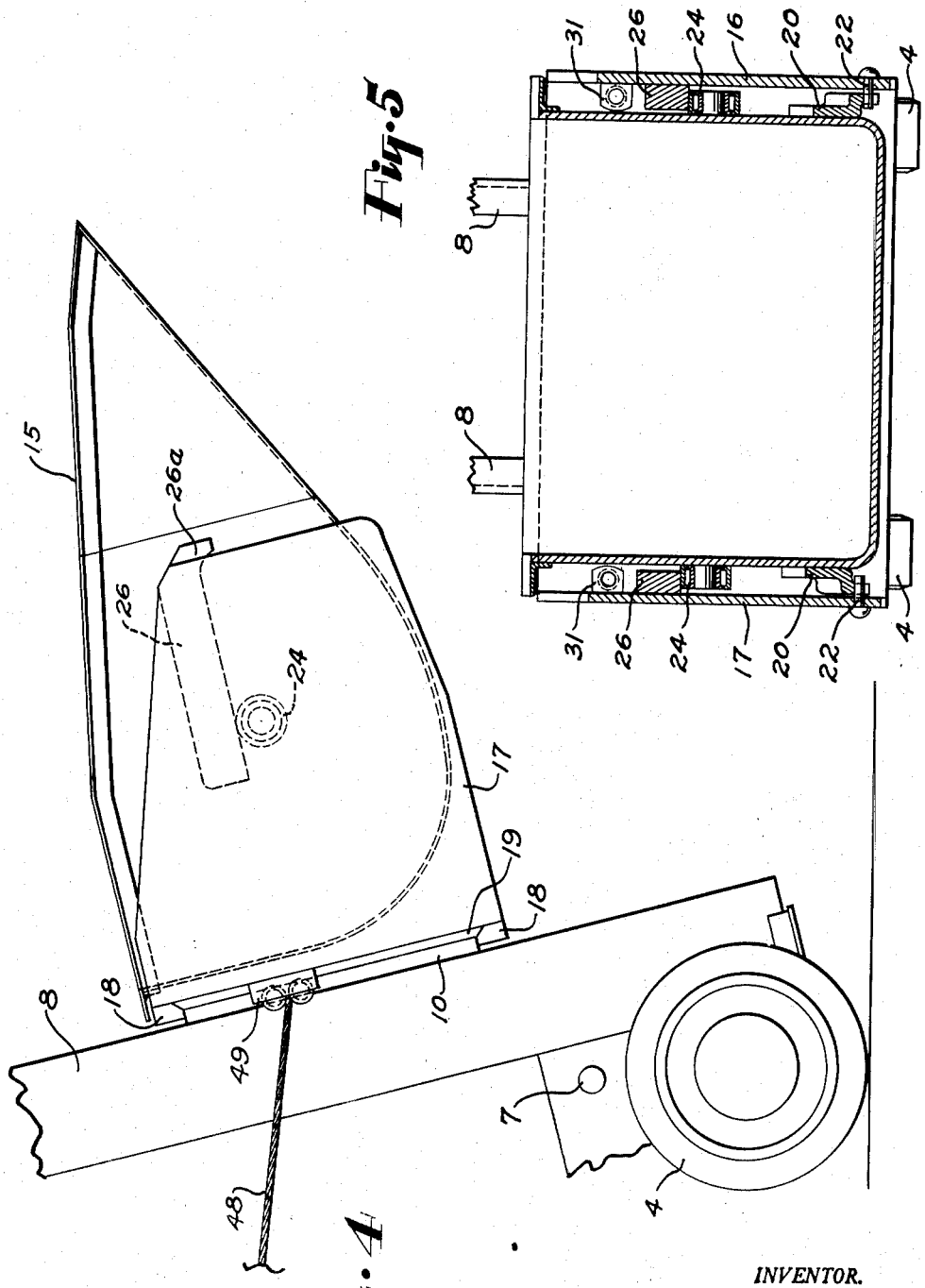

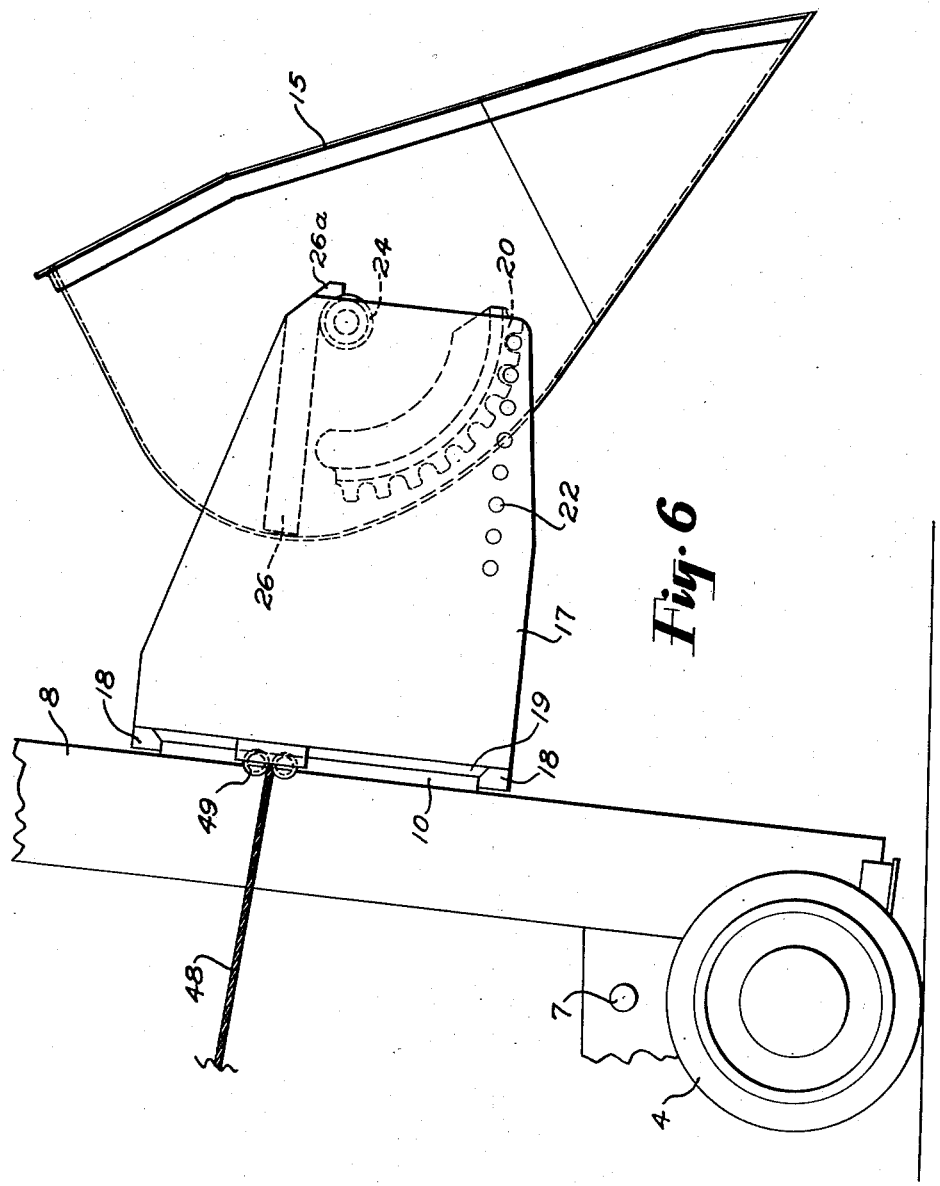

Patented Oct. 2, 1951

2,569,740

UNITED STATES PATENT OFFICE 2,569,740

SCOOP MECHANISM FOR TRUCKS

Edward J. Abbe, Cleveland Heights, Ohio, assignor to The Elwell-Parker Electric Company, Cleveland, Ohio, a corporation of Ohio Application September 7, 1946, Serial No. 695,343

6 Claims. (Cl. 214—120)

1

This invention is concerned with a transportable gravity bucket mechanism and has for its general object the provision of mechanism for scooping up loose material, retaining, transporting and discharging the same.

A more specific object of the invention is the provision of a scoop mechansim adaptable for use in combination with an industrial truck of the tiltable tire-lift type, the load scooping means being in the form of a rocker dump body and an associated mechanism mounted on the carriage of the tier-lift mechanism of the truck in such a manner that the dump body may be disposed in a load-scooping position adjacent the floor or other supporting surface of the truck.

A still further object is the provision of a scoop mechanism adaptable for attachment to an industrial truck in such manner that the scoop mechanism may be forced into a pile of material to be handled by a maneuvering operation of the truck, and which operation results in the uprighting of the scoop mechanism to load-retaining position, whereupon the load may be transported and then discharged into a railroad car or at some other point of destination.

Other objects and advantages of the invention will be apparent from the following detailed description of preferred forms of embodiment of the invention, reference being made to the accompanying drawings, wherein:

Fig. 2 is a side elevation of the truck;

Fig. 3 is a side elevation of the scoop mechanism positioned to engage a pile of material;

Fig. 4 shows the scoop positioned for transporting the load;

Fig. 5 is a cross-section taken through the scoop mechanism along the line 5—5 of Fig. 2; and Fig. 6 shows the mechanisim in load dumping position.

Figure 1:
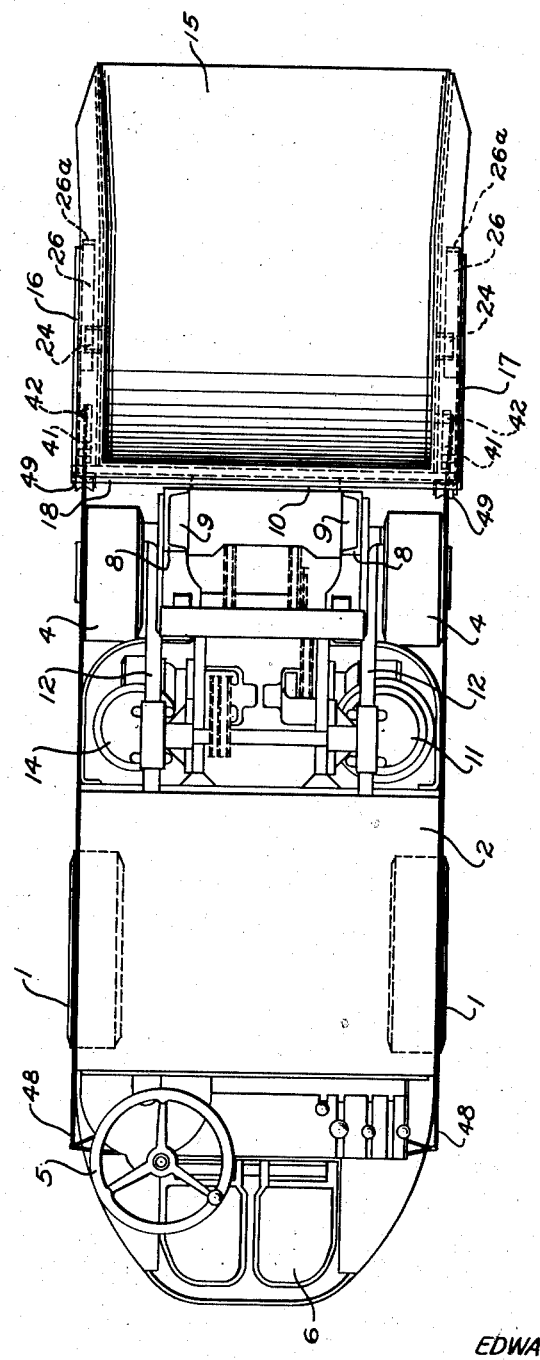
Fig. 1 is a plan view of an industrial truck equipped with an embodiment of my invention.

Referring more particularly to the drawings, I show generally an industrial truck of the tilting tier-lift type. The truck is provided at one end with a pair of dirigible wheels 1 disposed beneath a housing 2, within which is disposed a power plant for driving the wheels 1. In the drawings a truck is shown of the storage battery and electric motor power plant type. The wheels 1, as well as the non-driven or trail wheels 4, are adapted to be steered by means of a steering wheel 5 accessible to an operator standing on the platform 6 of the truck. This type of truck is highly maneuverable.

At the forward end of the truck is an upright frame, which is mounted for tiltable movement relative to the truck frame about a horizontal axis 7, the frame comprising cross-members and a pair of channels 8, which form tracks or guides for the rollers 9 of a load elevator mechanism 10. This load elevator is adapted to be raised and lowered by any suitable cable, or hydraulic or other mechanism. The drawings show an electric motor 11, to drive a cable drum 13 for raising and lowering the elevator. The frame comprising the channels 8, may be tilted about the axis 7 whenever desired and is tiltable forwardly about five degrees from a vertical or upright position and rearwardly about 15 degrees from the vertical, as indicated by the dot and dash lines in Fig. 2. Suitable mechanism comprising reciprocable rack bars 12 are pivotally connected to the channels, there being another power unit 14 for operating the rack bars 12 to tilt the upright frame as desired. Disposed to traverse the upright frame on the flanges of the channel members 8 are rollers or wheels 9 on the carriage or elevator mechanism 10.

The described truck is of the well-known tier-lift type, usually equipped with forwardly extending load forks or load platforms attached to the elevator mechanism 10. Instead of a cable drum 13 a chain and sprocket arrangement may be used. In either event the drum or sprocket center line would be coincident with the tilting axis of the upright frame structure.

The material scooping mechanisim is in the form of a rocker dump body 15, which is carried by a cradle structure in the form of the side plate members 16 and 17, the plate members being attached to the carriage 10. If desired, these plate members may be attached to a slide formation 18 whereby the cradle and dump body may be attached to and removed from the carriage of the truck. Hence the plate members may be the legs of a U-formation, to the base of which are attached slide members 18 which engage a slide plate 19 fixed to the carriage.

As shown in the drawings, the rocker dump body 15 has the forward part thereof constructed to form a scoop bucket which is rockably connected to the cradle structure by a rack and gear mechanism in such manner that the center of gravity of the bucket will always be forwardly of its rocking center, whether the bucket be in the loaded or unloaded condition.

The rack and gear mechanism comprises fan gear formations 20 secured to the side walls of the bucket and spaced outwardly therefrom whereby the teeth thereof engage with and roll upon rack formations comprising a series of equally spaced pins 22 secured to the side plates 16 and 17 of the cradle structure near the bottom margin thereof. Such a rack formation prevents the lodgment of dirt in the rack. Retaining rollers 24 are mounted on studs secured to the side walls of the bucket structure and engage track members 26 secured to the cradle plates 16 and 17 adjacent the top thereof. These members 26 have the outer portions 26a thereof extending downwardly to provide semi-formed hooks which serve as stops or retainers for the rollers 24 when the dump body is rocked outwardly to a load-spilling or discharging position, as shown in Fig. 6. Attached to the cradle plates 16 and 17, near the upper inner parts thereof, are cushion mechanisms, against which angle members 28 secured to the side walls of the bucket abut when the bucket is swung to a loaded or load-transporting position. These cushions comprise a pin member 29 disposed within a tube 30 which tube is supported by a bracket 31 secured to the cradle plate. Pin 29 is provided with a stem 29a and a bumper spring 31a disposed within the tube 30 to abut a shoulder on the stem 29 and the end of the tube 30. Adjustable nuts 32 at the end of the pin stem 29a permit relative adjustment of the two pins whereby the cushioning effect on the two angle members 28, disposed on each side of the bucket, may be equalized. These cushion mechanisms should be so located as to not interfere with swinging movements of the latch pins 42—44 and no effort has been made to show the exact locations of the cushioning means since the scoop is operable without the presence of these cushioning mechanisms.

Since the center of gravity of the bucket structure is forward of its pivotal center, means are provided for locking the bucket in loaded position and also for locking the bucket in a partially tilted position, that is, when the scooping end of the bucket is positioned adjacent the terra firma on which the pile of material to be transported is disposed. This locking mechanism may be in the form of a latching means, either attached to the carriage or to the cradle structure. As shown in the drawings, this last mentioned means comprises a shaft 40, supported by the cradle plates 16 and 17 and disposed beneath the inner end region of the bucket when the bucket is swung upwardly and inwardly to loaded position. Shaft 40 supports a pair of latching members 41 located between the cradle plates and the side walls of the bucket, the formation and location of these latch members 41 being such as to engage pins 42 projecting from the side walls of the bucket when the bucket is in loaded position. The arrangement is such that the latching members 41 will also engage a similar pair of pins 44 when the bucket is swung outwardly and downwardly with the scoop portion of the bucket substantially adjacent the ground or supporting surface of the truck. A spring member 46 maintains the pair of latches in pin-engaging position. To release the latches from the pins, a cable 48 is provided, passing through suitable guide rolls 49 to the operator's position on the truck.

The operation of the mechanism is as follows. Assume that the bucket is tilted to a load discharging position. The carriage 10 is being lowered to bring the cradle mechanism and bucket to a downward position. The scoop end of the bucket contacts the floor as the carriage approaches the floor. The bucket is thus rocked upwardly to a scooping position and the latches engage pins 44. Or the bucket may be in a horizontal position, in which case the upright frame is tilted forwardly slightly and latches 41 are released from pins 42. The scoop, by gravitational influence, rolls forwardly and the forward end thereof is swung downwardly into the load scooping position, at which point the latches 41 engage pins 44. The operator then advances the truck, causing the scoop to be forced into the pile of material. As the scoop is advanced into the pile the upright is first tilted through the five degrees to a vertical position and then rearwardly toward the operator, thus causing the scoop edge to be swung upwardly while the scoop is being loaded. Continued forward motion of the truck tends to cam the scoop end of the bucket upwardly, thus causing it to rock into a substantially horizontal position, and also roll backwardly between the cradle plates, whereupon the latch members 41 engage the pins 42. The operator may then elevate the carriage 10, back the truck away from the pile of material and transport the load to point of destination, at which point the operator, by releasing the latches 41 from pins 42 will permit the dump body to rock by gravitational influence to a load-discharging position, as shown in Fig. 6.

It will be noted that at no time is it necessary for the operator to leave his position on the truck and no manual labor is involved in handling the material other than the operator's exertions in maneuvering the truck. The appliance has utility in foundries, cement block plants and in all places where loose materials, such as sand, cinders, piles of debris and piles of indestructible articles can be scooped, transported and then dumped.

I claim:

1. A truck for handling loose material comprising a tiltable frame mounted on the truck, a carriage mechanism operably mounted on the tiltable frame to traverse the frame, a rocker dump body operably mounted on the carriage mechanism to be raised and lowered therewith, a latching mechanism for latching the dump body in a load carrying position on the carriage, said dump body being in the form of a scoop adapted to be advanced into a pile of material to scoop up a load consequent to a maneuvered movement of the truck, and rack and gear mechanism connecting the body to the carriage whereby the center of gravity of the dump body is disposed toward the load receiving end of the body to cause the scoop end of the body to swing downwardly when unlocked from the carriage mechanism.

2. A truck for handling loose material comprising, a power driven truck having an upright, tiltable frame mounted thereon, power means for tilting the frame, a carriage mounted on the frame for vertical movement thereon, a cradle on the carriage, a scoop bucket rockably mounted on the cradle and being swingable relative to the cradle from a load retaining position to a load dumping position, said scoop being mounted so that its center of gravity is at all times forward of its center of rotation, and latching means for latching the scoop in a scooping position intermediate said positions for permitting advancing of the scoop into a pile of material and operable to automatically latch the scoop when the latter is rotated to the load retaining position.

3. A truck for handling loose material comprising, a power driven truck having an upright, tiltable frame mounted thereon, power means for tilting the frame, a carriage mounted on the frame for vertical movement thereon, a cradle on the carriage, a scoop bucket rockably mounted on the cradle and being swingable relative to the cradle from a load retaining position to a load dumping position, and latching means for latching the scoop in a scooping position intermediate said two positions for permitting advancing of the scoop into a pile of material and to latch the scoop in said load retaining position when the scoop is rocked to the load retaining position.

4. A truck for handling loose material comprising, a power driven truck having an upright, tiltable frame mounted thereon, power means for tilting the frame, a carriage mounted on the frame for vertical movement thereon, a cradle on the carriage, a scoop bucket rockably mounted on the cradle and being swingable relative to the cradle in advancing forward from a load retaining position to a load dumping position, latching means normally operable to block swinging of the scoop from the scooping position toward the dumping position for permitting advancing of the scoop into a pile of material and normally operable to block swinging of the scoop from the load retaining position toward the load dumping position, said latching means being ineffective to limit swinging of the scoop in the direction from the load dumping position to load retaining position, and means for releasing the latching means to permit swinging of the scoop to the load dumping position.

5. A truck for handling loose material comprising a power driven truck having an upright, tiltable frame mounted thereon, power means for tilting the frame, a carriage mounted on the frame for vertical movement thereon, a cradle on the carriage, a scoop, means at each side of the scoop for mounting the scoop rockably on the cradle, said means including a fan gear fixed to the scoop meshing with a rack on the cradle, said scoop being forwardly advanceable from a load retaining position to a load dumping position, and latching means normally operable to block rocking of the scoop from a scooping position toward the dumping position for permitting advancing of the scoop into a pile of material and normally operable to block rocking of the scoop from the load retaining position toward the load dumping position.

6. A truck for handling loose material comprising a power driven truck having an upright, tiltable frame mounted thereon, power means for tilting the frame, a carriage mounted on the frame for vertical movement thereon, a cradle on the carriage, a scoop, means at each side of the scoop for mounting the scoop rockably on the cradle, said means including a fan gear fixed to the scoop meshing with a rack on the cradle and also including a retaining roller mounted to the scoop in rolling contact with a track member extending longitudinally on the cradle, the axis of said roller being coincident with the rocking axis of the cradle, said scoop being forwardly advanceable from a load retaining position to a load dumping position and being so mounted that its center of gravity is at all times forward of its center of rotation, latching means normally operable to block rocking of the scoop from a scooping position toward the dumping position for permitting advancing of the scoop into a pile of material and normally operable to block rocking of the scoop from the load retaining position toward the load dumping position, said latching means being ineffective to limit rocking of the scoop in the direction from a load dumping position to a load retaining position, and means for releasing the latching means to permit rocking of the scoop toward the load dumping position.

EDWARD J. ABBE.

REFERENCES CITED

The following references are of record in the file of this patent:

UNITED STATES PATENTS

| Number | Name | Date |
|---|---|---|
| 1,019,327 | Insley | Mar. 5, 1912 |
| 1,713,780 | Remde | May 21, 1929 |
| 2,282,613 | Sheets | May 12, 1942 |
| 2,386,519 | Wagner et al. | Oct. 9, 1945 |
| 2,398,859 | Ruddock | Apr. 23, 1946 |
| 2,405,312 | Mandt | Aug. 6, 1946 |
| 2,413,661 | Stokes | Dec. 31, 1946 |
| 2,421,472 | Way | June 3, 1947 |
| 2,439,139 | Le Tourneau | Apr. 6, 1948 |
| 2,462,790 | Van Voorhis | Feb. 22, 1949 |
| 2,482,692 | Quales et al. | Sept. 20, 1949 |